US010330966B2

(12) United States Patent
Oh et al.

(10) Patent No.: US 10,330,966 B2
(45) Date of Patent: Jun. 25, 2019

(54) DISPLAY DEVICE

(71) Applicant: LG DISPLAY CO., LTD., Seoul (KR)

(72) Inventors: Guen-Taek Oh, Busan (KR); Yeong-Ho Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 10 days.

(21) Appl. No.: 15/333,920

(22) Filed: Oct. 25, 2016

(65) Prior Publication Data
US 2017/0127536 A1    May 4, 2017

(30) Foreign Application Priority Data
Oct. 28, 2015  (KR) .................. 10-2015-0150089

(51) Int. Cl.
*G06F 1/16* (2006.01)
*H04M 1/02* (2006.01)
*G02F 1/1333* (2006.01)

(52) U.S. Cl.
CPC ...... *G02F 1/133308* (2013.01); *G06F 1/1637* (2013.01); *G02F 2001/13332* (2013.01); *G02F 2001/133314* (2013.01); *G02F 2001/133322* (2013.01); *G02F 2001/133328* (2013.01); *G02F 2201/46* (2013.01); *H04M 1/0266* (2013.01)

(58) Field of Classification Search
CPC .................................................. G06F 1/1333
See application file for complete search history.

(56) References Cited

U.S. PATENT DOCUMENTS

| 6,424,391 | B1 * | 7/2002 | Tsukamoto | G02F 1/133308 349/58 |
|---|---|---|---|---|
| 6,587,166 | B1 * | 7/2003 | Lee | G02F 1/133308 349/149 |
| 6,806,921 | B2 * | 10/2004 | Nishida | G02F 1/133308 349/58 |
| 6,919,937 | B2 * | 7/2005 | Kim | G02F 1/133308 349/58 |
| 7,646,447 | B2 * | 1/2010 | Kim | G02F 1/133308 349/58 |
| 8,437,120 | B2 * | 5/2013 | Lee | H05K 5/0217 361/679.01 |
| 8,550,689 | B2 * | 10/2013 | Han | G02B 6/0068 362/632 |
| 9,474,169 | B2 * | 10/2016 | Park | G02F 1/133308 |
| 2002/0080297 | A1 * | 6/2002 | Sung | G02F 1/133308 349/58 |
| 2005/0231658 | A1 * | 10/2005 | Chieh | G02F 1/133308 349/56 |
| 2006/0089023 | A1 * | 4/2006 | Kim | H05K 5/02 439/96 |
| 2007/0002591 | A1 * | 1/2007 | Chang | G02B 6/0088 362/633 |

(Continued)

*Primary Examiner* — David M Sinclair
*Assistant Examiner* — Theron S Milliser
(74) *Attorney, Agent, or Firm* — Birch, Stewart, Kolasch & Birch, LLP

(57) ABSTRACT

Discussed herein is a display device. In the display device, a guide frame that is a component of a display module is directly coupled with a decorative part by using a coupling unit formed on the guide frame, such that the number of components to be assembled can be reduced, and the device can be made lighter and thinner. In addition, the guide frame may be exposed to the outside to form the exterior of the device.

19 Claims, 15 Drawing Sheets

(56) References Cited

U.S. PATENT DOCUMENTS

| | | | | |
|---|---|---|---|---|
| 2007/0019440 | A1* | 1/2007 | Fang | G02B 6/0088 |
| | | | | 362/633 |
| 2008/0291354 | A1* | 11/2008 | Oh | G02F 1/133308 |
| | | | | 349/58 |
| 2009/0262554 | A1* | 10/2009 | Lee | G02F 1/133308 |
| | | | | 362/633 |
| 2009/0310288 | A1* | 12/2009 | Lee | G02F 1/133308 |
| | | | | 361/679.01 |
| 2012/0092585 | A1* | 4/2012 | Byeon | G02F 1/133308 |
| | | | | 349/58 |
| 2013/0050820 | A1* | 2/2013 | Shin | G06F 1/1601 |
| | | | | 359/465 |
| 2013/0194781 | A1* | 8/2013 | Kim | H04M 1/0266 |
| | | | | 362/97.1 |
| 2014/0232942 | A1* | 8/2014 | Yahata | H04N 5/64 |
| | | | | 348/725 |
| 2015/0208529 | A1* | 7/2015 | Sakong | H05K 5/0017 |
| | | | | 361/679.01 |
| 2015/0346539 | A1* | 12/2015 | Lee | G02F 1/133308 |
| | | | | 349/58 |
| 2015/0351261 | A1* | 12/2015 | Lee | G02F 1/1333 |
| | | | | 361/679.01 |
| 2016/0143161 | A1* | 5/2016 | Jeong | H05K 1/028 |
| | | | | 361/749 |

\* cited by examiner

DISPLAY DEVICE

CROSS REFERENCE TO RELATED APPLICATIONS

This application claims the priority benefit of the Korean Patent Application No. 10-2015-0150089 filed on Oct. 28, 2015, which is hereby incorporated by reference as if fully set forth herein.

BACKGROUND

Technical Field

The present disclosure relates to a display device and more particularly, to a display device that can be assembled with a reduced number of components and can be slimmer.

Description of the Related Art

Display devices include a liquid-crystal display device, an Electrophoretic display device, an organic light-emitting display device, an inorganic electro luminescent (EL) display device, a field emission display device, a surface-conduction electron-emitter display device, a plasma display, a cathode ray display device, and the like.

Among these, a liquid-crystal display (LCD) device is recently attracting attention since there are advantages in that it allows for mass production, is easy to drive, and achieves high-quality image and large screen.

An LCD device is an electronic device that converts various electrical information generated from a variety of devices by controlling the voltage applied across a liquid-crystal layer to vary the amounts of light passing through the liquid-crystal layer.

Since LCD devices can be driven with low power, become thinner and achieve good image quality, they are widely used as replacement for existing cathode ray tubes (CRTs) that can overcome the shortcomings.

Such a LCD device includes a liquid-crystal module, and a cover unit surrounding the liquid-crystal module or a display module.

FIG. 1 is an exploded, perspective view of a LCD device according to a related art to schematically illustrate a coupling relationship between a display module and a cover unit.

Referring to FIG. 1, the LCD device according to the related art includes a display module 10 and a cover unit 20. The cover unit is a system component. The display module 10 includes a display panel 11 and a guide frame 12 supporting the display panel 11.

The periphery of the guide frame 12 is exposed to the outside, and first coupling parts 12a are disposed on the exposed side surface. The cover unit 20 largely includes a middle frame 21, a rear cover 22, and a decorative part 23. The middle frame 21 is disposed under the display module 10. The middle frame 21 is fabricated in a rectangular shape.

In the periphery of the middle frame 21, second coupling parts 21a are formed, which are to be coupled with the first coupling parts 12a formed on the periphery of the guide frame, respectively.

In addition, third coupling parts 21b (see FIG. 2) are formed in the lower portion of the periphery the middle frame 21.

The rear cover 22 is disposed under the middle frame 21. Four coupling parts 22a are formed in the rear cover 22, which are to be coupled with the third coupling parts 21b, respectively.

In addition, the decorative part 23 is disposed on the upper surface of the display module 10. The decorative part 23 includes a plurality of hooks 23a extended downwardly at several locations.

FIG. 2 is an exploded, perspective view of a part of the LCD device according to the related art to specifically illustrate the coupling relationship between the display module 10 and the cover unit 20.

Referring to FIG. 2, the guide frame 12 supports the periphery of the display panel 11. The first coupling parts 12a formed on the periphery of the guide frame 12 are exposed to the outside.

The guide frame 12 is mounted on the middle frame 21. At this time, the first coupling parts 12a formed on the guide frame 12 are coupled with the second coupling parts 21a formed in the middle frame 21, respectively. Accordingly, the guide frame 12 supporting the display panel 11 is assembled with the middle frame 21 as it is mounted thereon.

The outer periphery of the guide frame 12 is surrounded by the middle frame 21. The rear cover 22 is disposed under the middle frame 21. The fourth coupling parts 22a formed on the rear cover 22 are coupled with the third coupling parts 21b formed in the middle frame 21, respectively. The rear cover 22 is coupled with the middle frame 21 thereon.

The above-described hooks 23a of the decorative part 23 are hung at predetermined positions of the middle frame 21 to be fixed thereto. The decorative part 23 may be coupled with the middle frame by screws rather than the hooks 23a.

In the LCD device with the above-described configuration, both of the decorative part 32 and the rear cover 22 are fixed to the middle frame 21. In the above-described manner, the guide frame 12 is mounted on the inner side of the middle frame 21.

In the related art LCD device with the above-described configuration, the guide frame 12 of the display module 10 is necessarily coupled with the middle frame 21 that is system component.

In other words, the LCD device according to the related art should have the middle frame 21 as an essential element to fix the decorative part 230, the rear cover 22 and the guide frame 12. That is, the existing middle frame 21 should have a structure that fixes all of the decorative part 230, the rear cover 22 and the guide frame 12.

Accordingly, the middle frame should fix the components of the display module and the system components, and thus there is a problem in that it is difficult to match the components if the display module and the system component are produced from different manufacturers.

In addition, the LCD device according to the related art requires the middle frame, and thus the number of components is increased and the cost for components is also increased.

Further, the LCD device according to the related art requires the middle frame, and thus it is difficult to reduce the size of the device.

Recently, research is ongoing into lighter and thinner LCD devices. Accordingly, what is required is a technique that allows a guide frame to perform the function of the middle frame to thereby eliminate the middle frame.

SUMMARY

It is an object of the present disclosure to provide a display device in which a guide frame that is a component of a display unit is assembled together with system components.

It is another object of the present disclosure to provide a display device in which a guide frame is directly coupled with a decorative part and a rear cover that are system components to thereby form the exterior of the display device.

In accordance with one aspect of the present disclosure, there is provided a display device including a guide frame that is coupled with a decorative part to form the exterior of the device.

The display device may include a display unit; a guide frame disposed at a periphery of the display unit; a decorative part disposed on a side of the periphery of the display unit and comprising fastening members; and one or more coupling unit formed on the guide frame and configured to couple the guide frame with the decorative part.

The coupling unit may be formed on a side of the periphery of the guide frame, each of the coupling units being coupled with the respective fastening members. The coupling units may be coupled with the fastening members in different directions. The coupling unit may include coupling projections and coupling ribs extended in different directions.

The coupling unit and the fastening members may be coupled in two or more different directions, such that they may be inserted into the fastening members of the decorative part.

A cutaway area may be formed in the guide frame in which the coupling units protrude, such that the coupling units may be disposed on the inner side of the outer periphery board of the guide frame.

The outer periphery of the guide frame except the cutaway area may be exposed to outside, to thereby form the exterior of the display device.

A rear cover may be coupled with the display unit thereon, such that the outer periphery of the guide frame may be exposed to the outside.

The lower cover may include a plurality of panel fixing grooves, and the plurality of panel grooves may be inserted into and fixed to the periphery of the guide frame. The lower cover may include an auxiliary coupling member inserted into an auxiliary fastening groove formed in the decorative part.

The rear cover may include a plurality of holding members that are extended upwardly to hang on the upper portion of the periphery of the guide frame, thereby preventing the guide frame from fluctuating.

In addition to the auxiliary fastening members formed on the decorative part, auxiliary coupling members are formed on the rear cover, which are extended upwardly and are to be coupled with the auxiliary fastening members formed on the decorative part, thereby enhancing the coupling between the rear cover and the decorative part.

In accordance with another aspect of the present disclosure, a display device includes a display unit; a guide frame disposed at a periphery of the display unit; a decorative part disposed on a side of the periphery of the display unit and comprising fastening members; a rear cover disposed under the guide frame; and a coupling unit formed in the rear cover and couples the guide frame with the decorative part.

The outer periphery of the rear cover may be exposed to the outside to thereby form the exterior of the display device.

First rear coupling members formed on a side of a periphery of the rear cover to be coupled with the fastening members, respectively, and second rear coupling members formed along the periphery of the rear cover to be coupled with the coupling members formed along the periphery of the guide frame, respectively, may be formed, such that the coupling unit of the rear cover may fix the decorative part and the guide frame together.

According to an exemplary embodiment of the present disclosure, the decorative part is fixed by using the guide frame to thereby eliminate the middle frame component used in related art display devices, such that the number of the components to be assembled can be reduced and thus cost for components can be saved.

In addition, according to an exemplary embodiment of the present disclosure, the outer periphery of the guide frame is exposed to the outside, thereby forming the exterior of the display device.

In addition, according to an exemplary embodiment of the present disclosure, the guide frame and the decorative part are coupled by the coupling forces in different directions, such that a fluctuation after they are coupled can be efficiently prevented.

Further, according to an exemplary embodiment of the present disclosure, the coupling units coupled with the decorative part are covered by the decorative part, such that the coupling units can be protected from external impact.

Additionally, according to an exemplary embodiment of the present disclosure, the rear cover is coupled with the guide frame, such that the rear cover can fix the guide frame.

Further, according to an exemplary embodiment of the present disclosure, the rear cover includes auxiliary coupling members, and the auxiliary coupling members are coupled with the decorative part, such that the decorative part can be fixed more stably.

DETAILED DESCRIPTION

Figure 1:
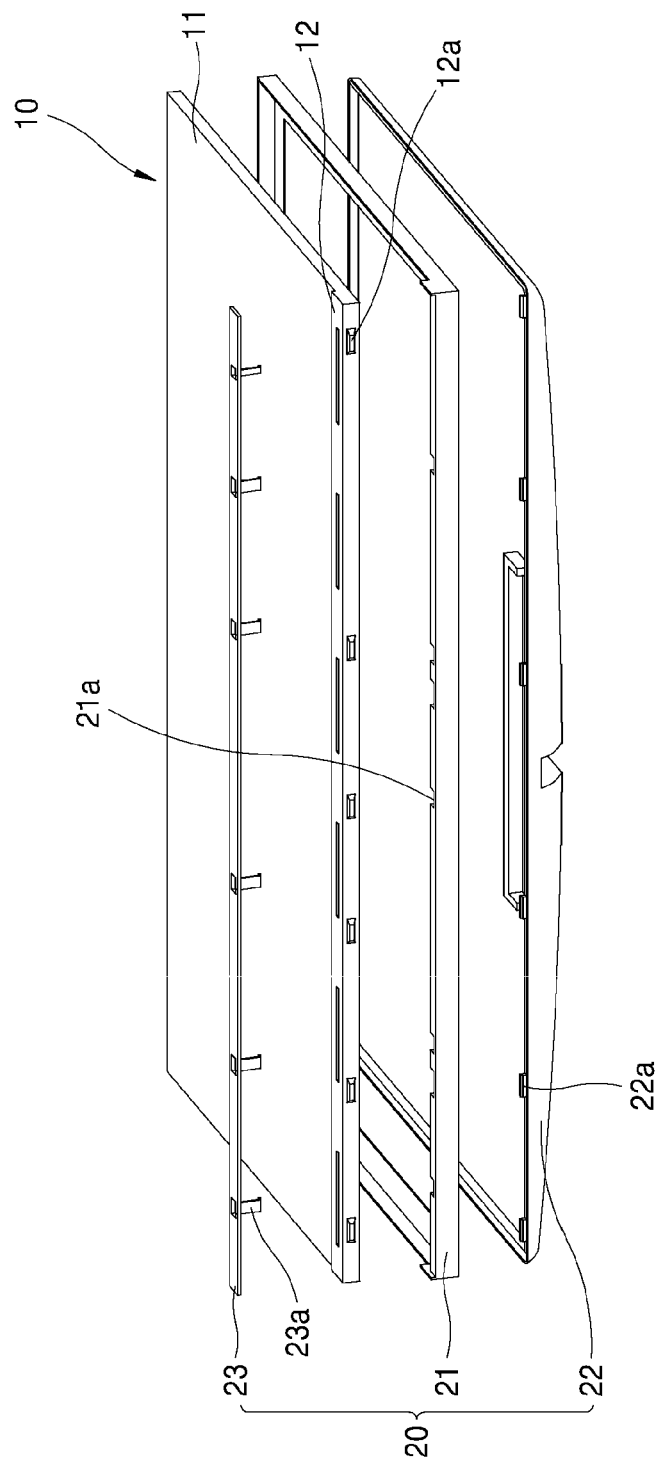
FIG. 1 is a perspective view of an LCD device to illustrate a coupling relationship between a display module and a cover unit, according to a related art.
Figure 2:
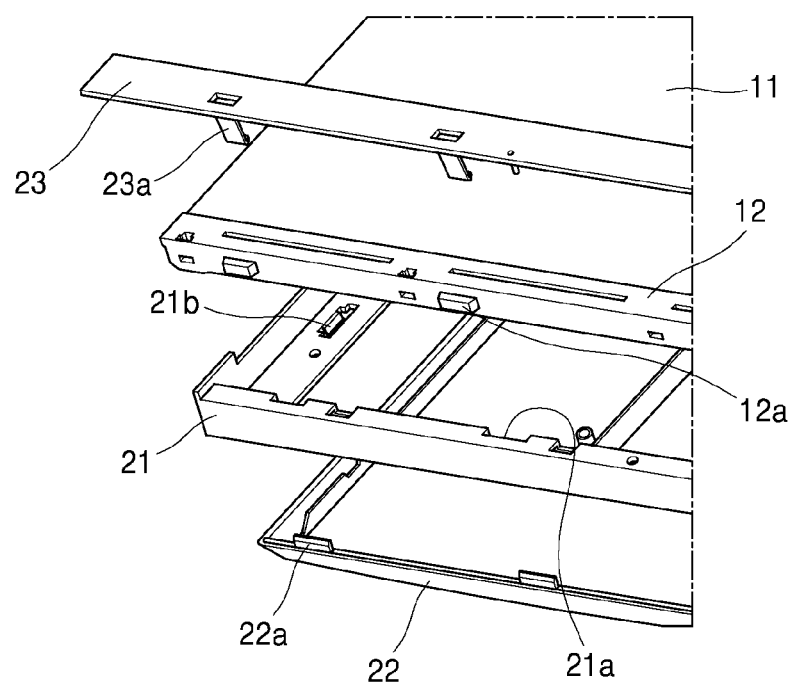
FIG. 2 is an exploded, perspective view of a part of the related art LCD device to specifically illustrate the coupling relationship between the display module and the cover unit.

In the following detailed description, reference is made to the accompanying drawings that show, by way of illustration, specific embodiments in which the claimed subject matter may be practiced. These embodiments are described in sufficient detail to enable those skilled in the art to practice the subject matter. The present disclosure may, however, be embodied in many different forms and should not be construed as limited to the embodiments set forth herein.

Elements well known in the art may have been omitted in order not to unnecessarily obscure the gist of the present disclosure. Like reference numerals designate like elements throughout the specification.

As used herein, when an element such as a layer, region, substrate, or panel is referred to as being "on" or "under" another element, it can be directly on or under the other element or intervening elements may also be present.

Hereinafter, a display device according to an exemplary embodiment of the present disclosure will be described in detail with reference to the accompanying drawings.

According to an aspect of the present disclosure, there is provided a display device including a guide frame that is coupled with a decorative part to form the exterior of the device.

Figure 3:
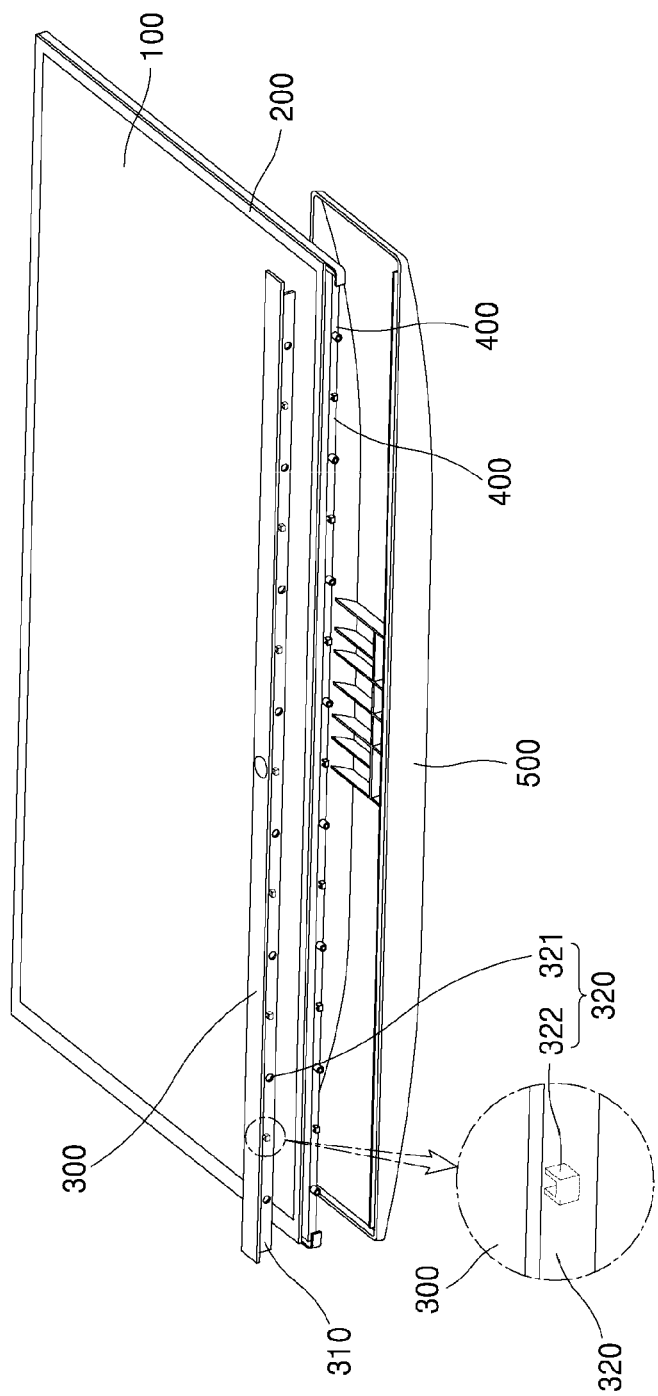
FIG. 3 is a perspective view of a display device according to an exemplary embodiment of the present disclosure to illustrate a coupling relationship between a guide frame and a decorative part.

FIG. 3 is an exploded, perspective view of a display device according to an exemplary embodiment of the present disclosure to illustrate a coupling relationship between a guide frame and a decorative part. All the components of the display device according to all embodiments of the present disclosure are operatively coupled and configured.

Referring to FIG. 3, the display device according to the exemplary embodiment of the present disclosure may include a display unit 100, a guide frame 200, a decorative part 300, coupling means 400, and a rear cover 500. In the present application, the coupling means may be referred to as coupling unit(s), and can be one or more coupling means/units.

The elements of the display device will be described in detail.

The display unit 100 is a display panel on which images are displayed. In this exemplary embodiment, the display unit 100 is a rectangular display panel, for example.

The guide frame 200 surrounds the periphery of the display unit 100 to support the display unit 100. A lower cover is disposed under the guide frame 200. The lower cover may be coupled with the guide frame 200 thereon.

The decorative part 300 is disposed on a side of the periphery of the display unit 100 such that it is exposed to the outside. The decorative part 300 is a component exposed to the outside of the display device. The decorative part 300 may include a button such as a power button. The decorative part 300 includes a decorative panel 310 extended thereunder.

The decorative panel 310 includes fastening members 320. The fastening members 320 may include fastening holes 321 and fastening projections 322.

The fastening holes 321 and the fastening projections 322 may be spaced apart from one another in the longitudinal direction of the decorative panel 310.

Preferably, the number of the fastening holes 321 and the fastening projections 322 are equal to that of the coupling means 400 formed in the guide frame 200, and coupled with coupling projections 420 and coupling ribs 410, respectively. The configuration of the coupling means 400 will be described in detail below.

The decorative part 300 is coupled with the guide frame 200 by the coupling means 400. The rear cover 500 is disposed under the guide frame 200.

Figure 4:
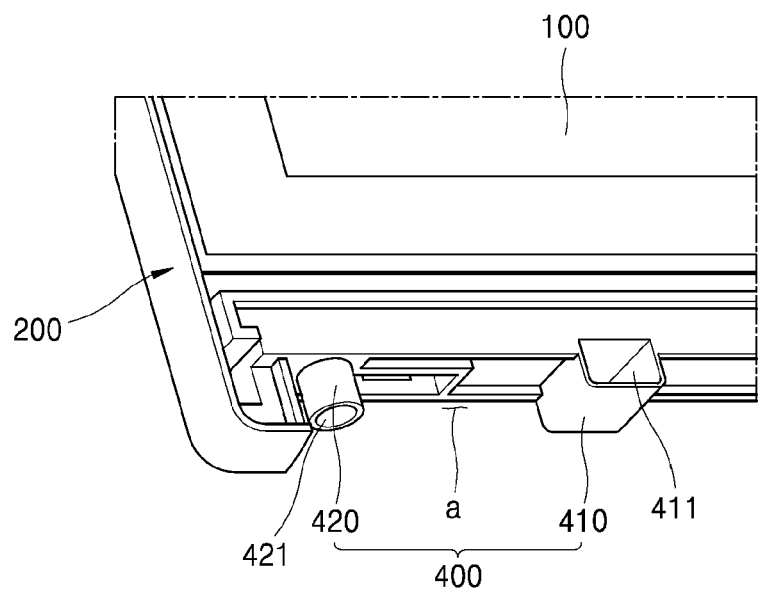
FIG. 4 is a perspective view of coupling means according to an exemplary embodiment of the present disclosure to illustrate shapes of coupling means formed on the guide frame.

FIG. 4 is a perspective view of coupling means according to an exemplary embodiment of the present disclosure to illustrate shapes of coupling means formed on the guide frame.

The configuration of the coupling means 400 will be described with reference to FIG. 4.

A cutaway area (a) is formed in the side of the periphery of the guide frame 200, which is spaced inwardly of the outer periphery board of the guide frame 200.

The coupling means 400 protrude outwardly from the side of the periphery of the guide frame 200. The coupling means 400 include coupling projections 420 and coupling ribs 410.

The coupling projection 420 is a so-called "boss" and protrudes in a first direction toward the outside of the guide frame 200. A first coupling hole 421 is formed in the coupling projection 420.

The coupling rib 410 protrudes from the guide frame 200 and is extended in a second direction toward the outside. A second coupling hole 411 is formed in the coupling rib 410.

The second coupling hole 411 is formed by a rectangular rib.

The second direction may be extended toward the top surface of the guide frame 200. The second coupling hole 411 is opened upwardly. The outer surface of the coupling rib 410 may be curved so that it can absorb external impact.

The coupling projection 420 and the coupling rib 410 are formed on the side of the periphery of the guide frame 200 such that they are extended in different directions. According to the exemplary embodiment of the present disclosure, the coupling means are formed on the guide frame and are formed as the coupling ribs 410 and the coupling projections 420 having different shapes, so that different coupling forces can be achieved by the different shapes.

Preferably, the first direction is perpendicular to the second direction. In addition, more than one coupling projections 420 and more than one coupling ribs 410 are formed.

The numbers of the coupling projections 420 and the coupling ribs 410 are equal to those of the fastening holes 321 and the fastening projections 322 shown in FIG. 3, respectively. Accordingly, the coupling projections 420 and the coupling ribs 410 are coupled with the fastening holes 321 and the fastening projections 322, respectively, such that the guide frame 200 and the decorative part 300 can be produced as a single component that can be coupled with either, without being limited to a particular coupling shape.

Figure 5:
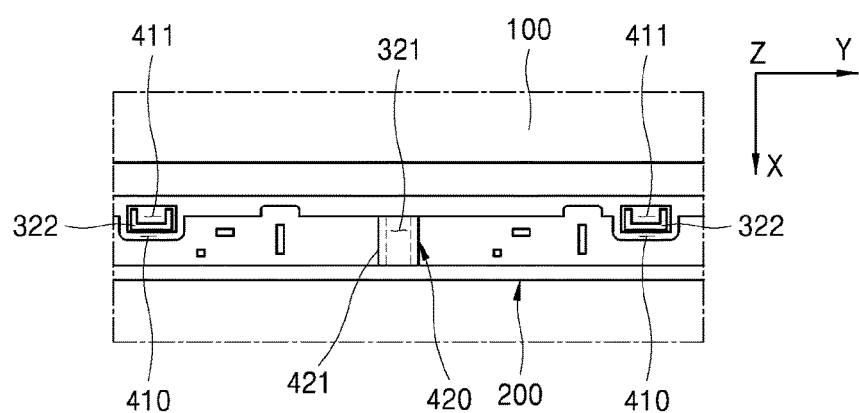
FIG. 5 is a plan view of the decorative part coupled with the guide frame according to an exemplary embodiment of the present disclosure to illustrate a coupling relationship between the fastening members and the coupling means.

FIG. 5 is a plan view of the decorative part coupled with the guide frame according to an exemplary embodiment of the present disclosure to illustrate a coupling relationship between the fastening members and the coupling means.

According to the exemplary embodiment, the guide frame and the decorative part are assembled by coupling the fastening projections with the coupling ribs, and the fastening holes with the coupling projections, respectively.

Referring to FIG. 5, a fastening projection 322 formed on the decorative part 300 is inserted into and fixed to a second coupling hole 411 of a coupling rib 410 formed on the guide frame 200.

The fastening projection 322 is coupled with the coupling rib 410 in the first direction along the z-axis.

In addition, a fastening hole 321 formed in the decorative part 300 is inserted into and fixed to a second coupling hole 421 of a coupling projection 420 formed on the guide frame 200.

The fastening hole 321 is bored in a circular shape, and the second coupling hole 421 has a circular shape. The fastening hole 321 is coupled with the coupling projection 420 in the second direction along the x-axis.

In this manner, the direction in which the fastening projections 322 are coupled with the coupling ribs 410 is different from the direction in which the fastening holes 321 are coupled with the coupling projections 420, at a number of positions. In addition, according to the exemplary embodiment, the fastening members 320 and the coupling means 400 are coupled with each other in two or more directions.

The guide frame 200 and the decorative part 300 are coupled by the coupling forces in different directions, such that they can be coupled with each other stably.

In addition, as the outer surface of the coupling rib 410 is curved, impact exerted when or after the guide frame 200 is coupled with the decorative part 300 can be dispersed.

Further, as the fastening hole 321 is inserted into the coupling projection 420 with a circumferential shape, impact exerted when or after the guide frame 200 is coupled with the decorative part 300 can be further dispersed.

Figure 6:
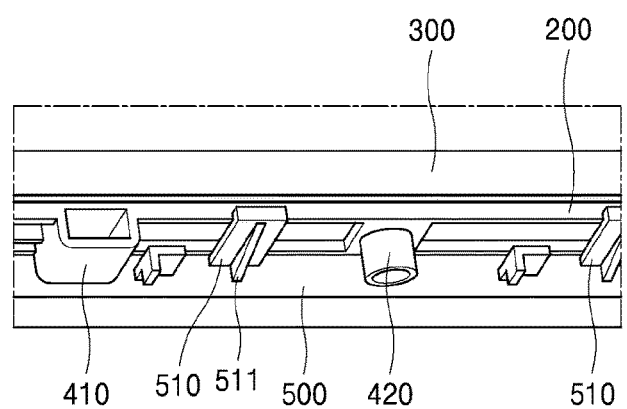
FIG. 6 is a perspective view of the guide frame coupled with the rear cover according to an exemplary embodiment of the present disclosure to illustrate a coupling relationship between holding members and the guide frame.

FIG. 6 is a perspective view of the guide frame coupled with the rear cover according to an exemplary embodiment of the present disclosure to illustrate a coupling relationship between holding members and the guide frame.

Referring to FIG. 6, according to the exemplary embodiment of the present disclosure, the rear cover 500 is disposed under the display unit 100.

The rear cover 500 has a plurality of holing members 510. The holding members 510 are equally spaced apart from one another along the periphery of the rear cover 500.

The holding members 510 are extended upwardly from the periphery of the rear cover 500. The upper end of each of the holding members 510 is bent so that it can be hung on the target object, i.e., the upper portion of the guide frame 200. For example, the holding members 510 may be hooks. The holding members 510 are tightly attached to the side of the periphery of the guide frame 200.

The tightly attached, upper end of each of the holding members 510 is hung on the upper portion of the side of the periphery of the guide frame 200.

A reinforcing piece 511 that widens from its upper end to the lower end is formed on the outer surface of each of the holding members 510.

When the holding members 510 are hung on the upper portion of the side of the periphery of the guide frame 200, the reinforcing piece 511 prevents breakage caused when the holding members 510 are released as the device fluctuates up and down.

Hooks or the like may be formed on the periphery of the rear cover 500 so that the rest part of the periphery of the guide frame 200 except for the side can be fixed.

Hereinafter, a process of assembling the display device according to an exemplary embodiment of the present disclosure will be described with reference to FIGS. 7 to 10.

Figure 7:
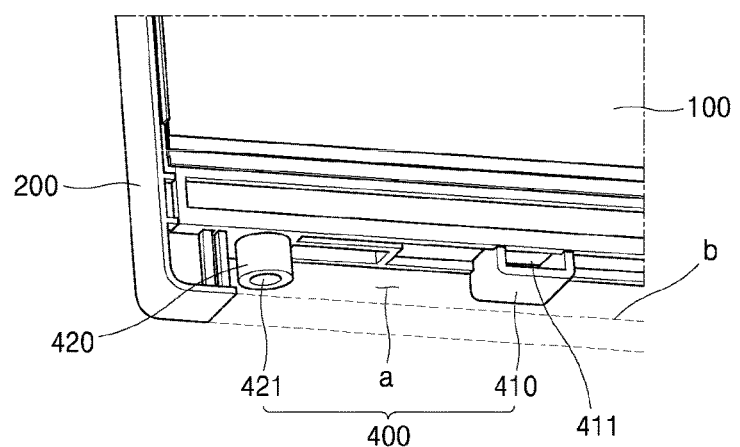
FIG. 7 is a perspective view of the guide frame according to an exemplary embodiment of the present disclosure to illustrate coupling members of the guide frame.

FIG. 7 is a perspective view of the guide frame according to an exemplary embodiment of the present disclosure to illustrate coupling means of the guide frame.

Referring to FIG. 7, the periphery of the display unit 100 is supported by the guide frame 200.

On the side of the periphery of the guide frame 200, a coupling means including a coupling projection 420 and a coupling rib 410 protrude outwardly.

The coupling means 400 are disposed in a cutaway area (a) which is spaced inwardly of the outer periphery border (b) on the side of the guide frame 200. Accordingly, the coupling means 400 are separated from the outer periphery of the guide frame 200, such that they can be protected from external impact.

According to an exemplary embodiment of the present disclosure, the outer periphery of the guide frame 200 is exposed to the outside. Accordingly, the outer periphery of the guide frame 200 may form the exterior of the display device. In addition, the outer periphery except the cutaway area (a) is exposed to the outside, such that the side of the decorative part 300 may be located.

Figure 8A:
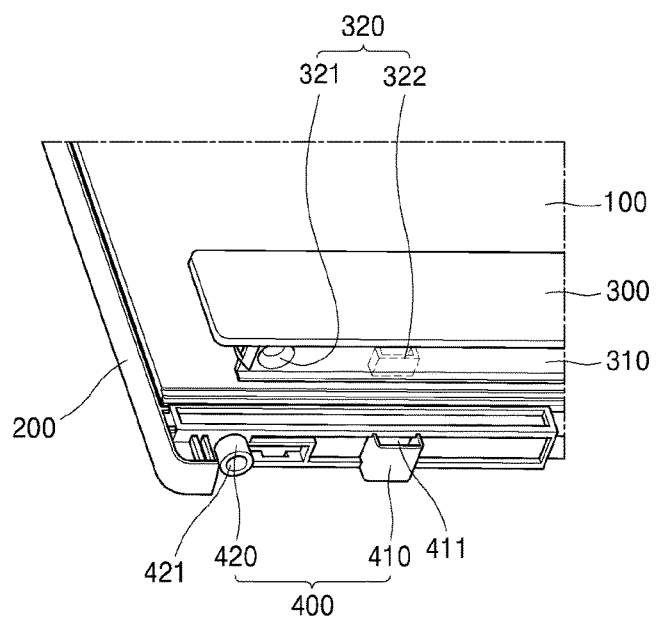
FIG. 8A is a perspective view showing the guide frame and the decorative part according to an exemplary embodiment of the present disclosure to illustrate a process of coupling the guide frame with the decorative part.

FIG. 8A is a perspective view showing the guide frame and the decorative part according to an exemplary embodiment of the present disclosure to illustrate a process of coupling the guide frame with the decorative part.

Referring to FIG. 8A, the decorative part 300 is disposed on the upper surface of the display unit 100.

The decorative panel 310 extended under the decorative part 300 is disposed on the side of the coupling means 400 formed on the guide frame 200.

A fastening holes 321 formed in the decorative panel 310 is inserted into and coupled with a first coupling hole 421 of a coupling projection 420 formed on the side of the periphery of the guide frame 200.

At the same time, a fastening projection 322 formed on the decorative panel 310 is inserted into and coupled with a second coupling hole 411 of a coupling rib 410 formed on the side of the periphery of the guide frame 200.

Since the coupling projection 420 and the coupling rib 410 are extended in different directions, the fastening members 320 are coupled with them in different directions, respectively.

The guide frame 200 and the decorative part 300 are coupled by the coupling forces in different directions, such that they can be coupled with each other more stably.

According to the exemplary embodiment of the present disclosure, the decorative part 300 can be directly coupled with and fixed to the guide frame 200 without any additional middle frame.

Figure 8B:
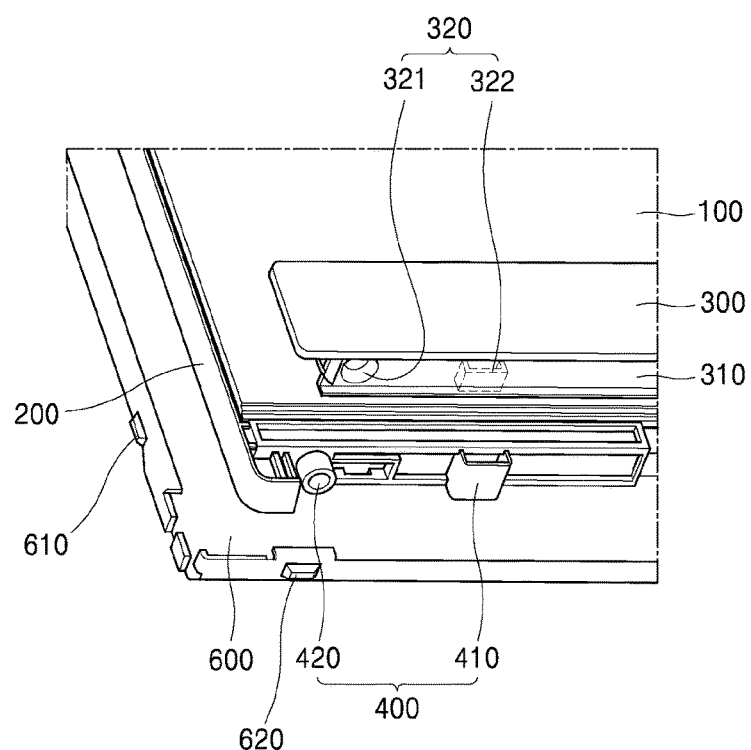
FIG. 8B is a perspective view showing the guide frame and the lower cover according to an exemplary embodiment of the present disclosure to illustrate a process of coupling the guide frame with the lower cover.

FIG. 8B is a perspective view showing the guide frame and the lower cover according to an exemplary embodiment of the present disclosure to illustrate a process of coupling the guide frame with the lower cover.

Referring to FIG. 8B, according to the exemplary embodiment of the present disclosure, the rear cover 600 is disposed under the guide frame 200. The periphery of the lower cover 600 may be inserted inside the periphery of the guide frame 200.

A plurality of protrusions 610 and 620 are formed on the sides of the lower cover 600. The protrusions 610 and 620 are fitted into and fixed to fitting grooves formed in the inner side surfaces of the periphery of the guide frame 200.

In the above-described manner, the lower cover 600 is located on the inner side of the guide frame 200. That is, the lower cover 600 is not exposed to the outside of the guide frame 200.

Figure 9:
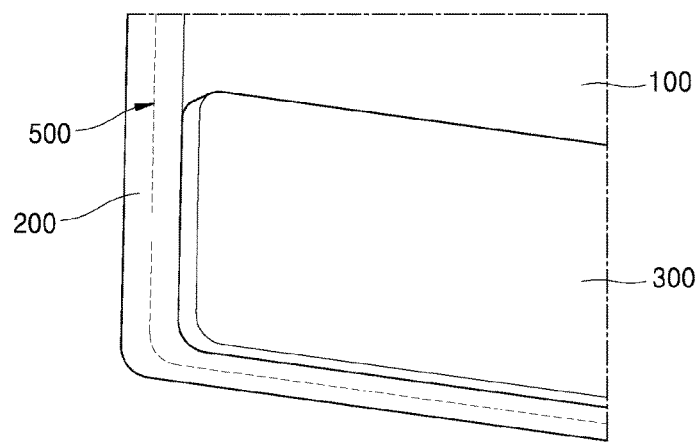
FIG. 9 is a perspective view showing a part of the exterior of a display device according to an exemplary embodiment of the present disclosure to illustrate a coupling relationship among the guide frame, the decorative part and the rear cover.
Figure 10:
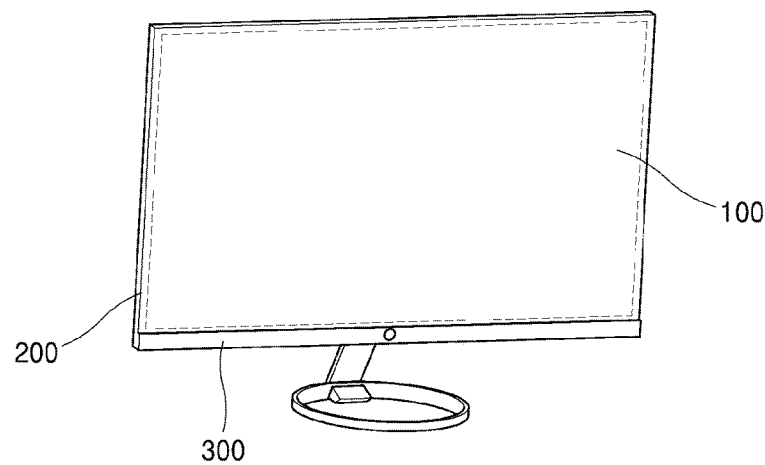
FIG. 10 is a perspective view showing the entire exterior of the display device according to the exemplary embodiment of the present disclosure.

FIG. 9 is a perspective view showing a part of the exterior of a display device according to an exemplary embodiment of the present disclosure to illustrate a coupling relationship among the guide frame, the decorative part and the rear cover. FIG. 10 is a perspective view showing the entire exterior of the display device according to the exemplary embodiment of the present disclosure.

Referring to FIG. 9, the outer periphery of the guide frame 200 according to the exemplary embodiment is exposed to the outside.

That is, according to the exemplary embodiment, the guide frame 200 is coupled via the process described above with reference to FIGS. 7 to 8B, thereby forming the exterior of the display device as shown in FIG. 10.

According to the exemplary embodiments of the present disclosure with the above-described configurations and effects, the decorative part is fixed by using the guide frame to thereby eliminate the middle frame component used in existing display devices, such that the number of the components to be assembled can be reduced and thus cost for components can be saved.

In addition, the outer periphery of the guide frame according to the exemplary embodiment is exposed to the outside, thereby forming the exterior of the display device.

In addition, according to the exemplary embodiment, the guide frame and the decorative part are coupled by the coupling forces in different directions, such that a fluctuation after they are coupled with each other can be effectively prevented.

Further, according to the exemplary embodiment, the coupling means coupled with the decorative part are covered by the decorative part, such that the coupling means can be protected from external impact.

According to another aspect of the present disclosure, there is provided a display device in which a decorative part and a guide frame can be fixed by using a rear cover.

Figure 11:
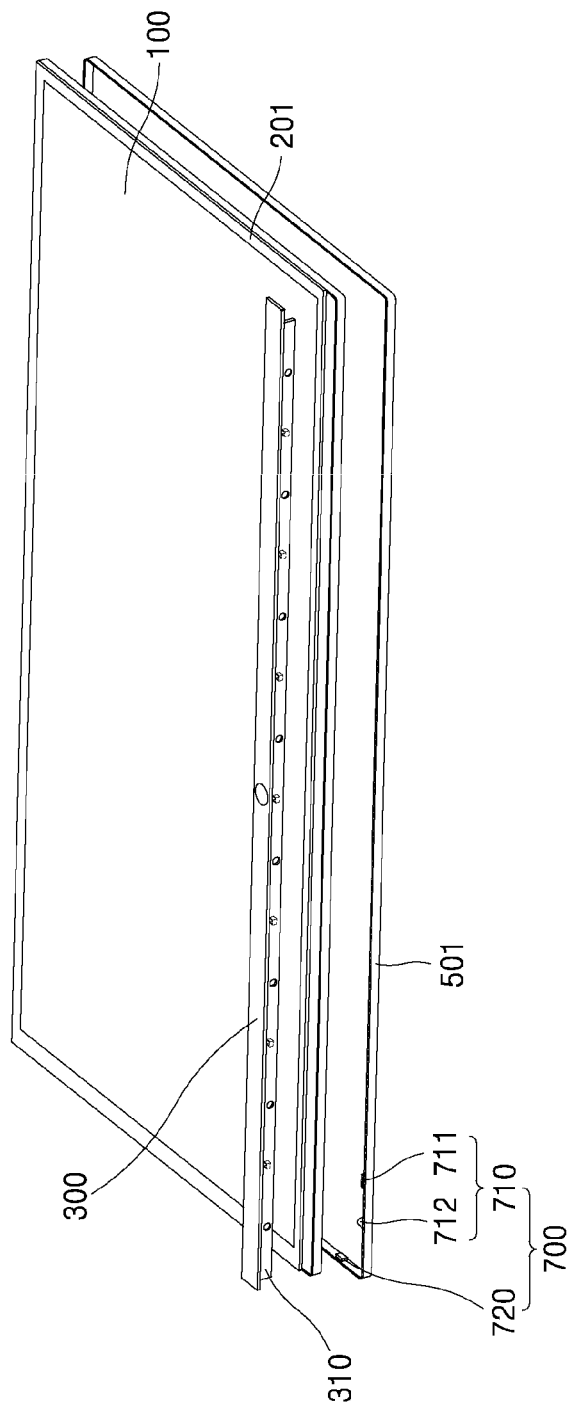
FIG. 11 is an exploded, perspective view of a display device according to another exemplary embodiment of the present disclosure to illustrate the overall coupling relationship among a rear cover, a guide frame and a decorative part.
Figure 12:
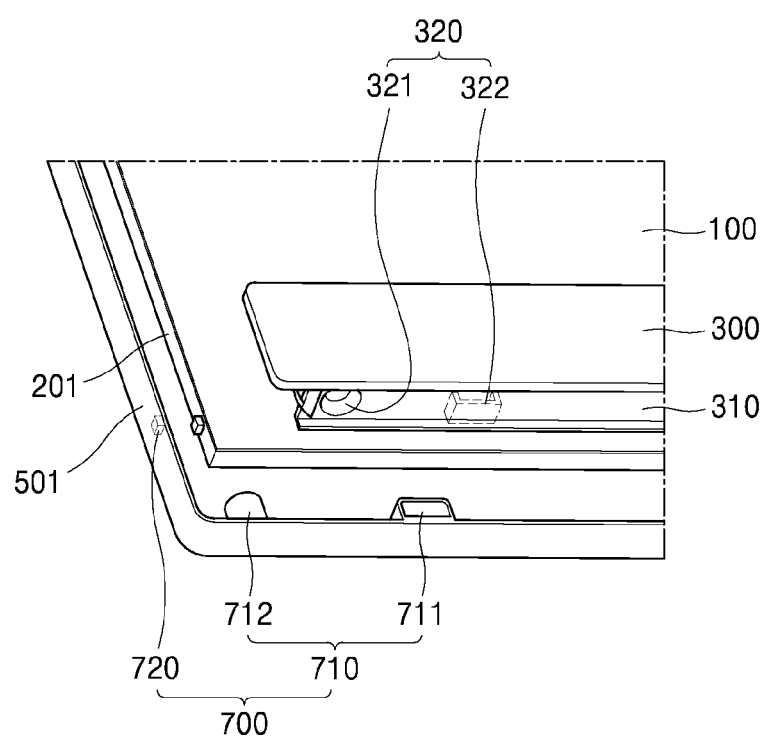
FIG. 12 is an exploded, perspective view of the display device according to the exemplary embodiment of the present disclosure to illustrate a coupling relationship among a rear cover, a guide frame and a decorative part in more detail.

FIG. 11 is an exploded, perspective view of a display device according to another exemplary embodiment of the present disclosure to illustrate the overall coupling relationship among a rear cover, a guide frame and a decorative part. FIG. 12 is an exploded, perspective view of the display device according to the exemplary embodiment of the present disclosure to illustrate the coupling relationship among the rear cover, the guide frame and the decorative part in more detail.

Referring to FIGS. 11 and 12, the display device according to the exemplary embodiment of the present disclosure includes a display unit 100, a guide frame 201, a decorative part 300, a rear cover 501, and coupling means 700.

Detailed descriptions of the substantially identical elements will be omitted to avoid redundancy or may be brief.

A protruding side coupling member 201a is formed on a side of the periphery of the guide frame 201. In addition, the decorative part 300 is disposed on the upper surface of a side of the guide frame 201 and includes fastening members 320. The fastening members 310 include fastening holes 321 and fastening projections 322.

The rear cover 501 is coupled with the guide frame 201 thereon. The rear cover 501 is coupled with the guide frame 201 thereon and surrounds the guide frame 201. The rear cover 501 itself forms the exterior of the display device. The rear cover 501 may fix the decorative part 300 and the guide frame 201 by the coupling means 700

Referring to FIG. 12, the coupling means 700 are formed on the rear cover 501.

The coupling means 700 include first rear coupling members 710 and second rear coupling members 720. The first rear coupling members 710 are coupled with the fastening members 320, respectively, at the side of the periphery of the rear cover 501. The first rear coupling members 710 protrude from and are extended along the inner periphery of the rear cover 501.

More than one first rear coupling members 710 are disposed, each of which includes a boss 712 and a groove 711. The number of the first rear coupling members 710 is equal to the number of the fastening members 320 so that they correspond to each other.

The boss 712 is inserted into the fastening hole 321, and the fastening projection 322 is inserted into the groove 711. Accordingly, the decorative part 300 is fixed by the first rear coupling members 710.

In addition, the second rear coupling members 720 are formed along the periphery of the rear cover 501 and are coupled with the side coupling members 201a formed along the periphery of the guide frame 201, respectively.

The second rear coupling members 720 are configured as fixing grooves. In the following description, the second rear coupling member and the fixing groove are denoted by the same reference numeral "720."

The side coupling members 201a are inserted into the fixing grooves 720 formed in the rear cover 501, respectively, such that the guide frame 201 is fixed by the rear cover 501.

The guide frame 201 is disposed on the inner side of the rear cover 501. The periphery of the rear cover 501 may be exposed to the outside to thereby form the exterior of the display device.

According to the exemplary embodiment with the above configuration, the rear cover may form the exterior of the display device while fixing the decorative part and the guide frame.

Accordingly, according to the exemplary embodiment, the decorative part and the guide frame are fixed by using the rear cover to thereby eliminate the middle frame component used in existing display devices, such that the number of the component to be assembled can be reduced and thus cost for components can be saved.

In addition, according to the exemplary embodiment, the outer periphery of the rear cover is exposed to the outside, thereby forming the exterior of the display device.

In addition, according to the exemplary embodiment, the guide frame is disposed inside the rear cover, and the rear cover is used to integrate the rear face and side faces of the display device to form the exterior. Accordingly, there is an advantage in that the exterior of the display device can be simpler.

According to yet another aspect of the present disclosure, there is provided a display device in which a decorative part and a guide frame can be fixed by using a lower cover.

Figure 13:
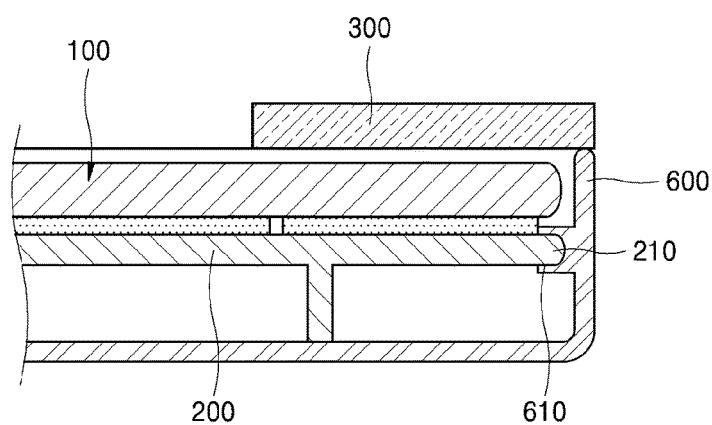
FIG. 13 is a cross-sectional view showing a display device according to yet another exemplary embodiment of the present disclosure to illustrate a general coupling relationship between a lower cover and a guide frame.

FIG. 13 is a cross-sectional view showing a display device according to yet another exemplary embodiment of the present disclosure to illustrate a general coupling relationship between a lower cover and a guide frame.

According to yet another aspect of the present disclosure, there is provided a display device in which the guide frame 200 and the decorative part 300 can be fixed by using the lower cover 600.

Detailed descriptions of the substantially identical elements will be omitted to avoid redundancy or may be brief.

The lower cover 600 is coupled with the display unit 100 thereon. The above-described rear cover is coupled with the lower cover 600 thereon.

The outer periphery of the lower cover 600 may be exposed to the outside to thereby form the exterior of the display device. The lower cover 600 has a plurality of panel fixing grooves 610 for fixing the guide frame 200.

The panel fixing grooves 610 are formed along the inner periphery of the lower cover 600. A plurality of panel projections 210 to be inserted into the panel fixing grooves 610, respectively, is formed on the periphery of the guide frame 200. Accordingly, the panel projections 210 are inserted into the panel fixing grooves 610, respectively, such that the guide frame 200 can be supported.

The guide frame 200 may be located on the inner side of and surrounded by the lower cover 600.

Figure 14:
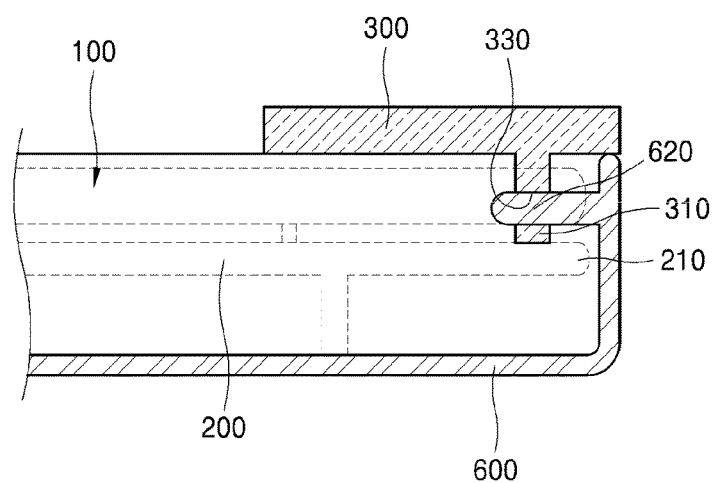
FIG. 14 is a cross-sectional view showing the display device according to the exemplary embodiment of the present disclosure from a different viewpoint, to specifically illustrate a coupling relationship between the lower cover and the decorative part.

FIG. 14 is a cross-sectional view showing the display device according to the exemplary embodiment of the present disclosure from a different viewpoint, to specifically illustrate a coupling relationship between the lower cover and the decorative part.

According to this exemplary embodiment of the present disclosure, the decorative part 300 has an auxiliary fastening groove 330 as shown in FIG. 14.

The auxiliary fastening groove 330 traverses the decorative panel 310 extended downwardly. The guide frame 200 is fixed to the lower cover 600 as shown in FIG. 13. The decorative part 300 is disposed on the upper surface the display unit 100. An auxiliary coupling member 620 is formed on the inner periphery of the lower cover 600, which protrudes inwardly. The auxiliary coupling member 620 is inserted into the auxiliary fastening groove 330 formed in the decorative part 300.

With the above configuration, according to this exemplary embodiment, there is an advantage in that the guide frame and the decorative part can be fixed by using the lower cover without exposing the guide frame to the outside.

In addition, according to this exemplary embodiment, the outer periphery of the lower cover is exposed to the outside, thereby forming the exterior of the display device.

Although the exemplary embodiments of the present disclosure have been described for illustrative purposes, those skilled in the art will appreciate that various modifications, additions and substitutions are possible without departing from the scope and spirit of the present disclosure. Accordingly, it will be understood that such modifications, additions and substitutions also fall within the scope of the present disclosure.

Although the exemplary embodiments of the present disclosure have been described for illustrative purposes, those skilled in the art will appreciate that various modifications, additions and substitutions are possible without departing from the scope and spirit of the present disclosure. Accordingly, it will be understood that such modifications, additions and substitutions also fall within the scope of the present disclosure.

What is claimed is:

1. A display device comprising:
   a display unit;
   a guide frame contacting and supporting the display unit, wherein the guide frame includes an outer periphery board and a plurality of coupling means; and
   a decorative part provided only along a lower edge of the display unit and comprising fastening members,
   wherein the plurality of coupling means of the guide frame is provided at the lower edge of the display unit to couple the decorative part to the guide frame,
   wherein the guide frame surrounds an entire periphery of the display unit,
   wherein the outer periphery board of the guide frame surrounds a top edge and side edges of the display unit and surrounds only a portion of the lower edge of the display unit at first and second ends thereof, the second end being spaced apart from the first end along the lower edge of the display unit, and
   wherein the guide frame is exposed to outside forming an exterior of the display device and providing an aesthetic appearance for the display device.

2. The display device of claim 1, wherein the plurality of coupling means are formed on a side of a periphery of the guide frame, and each of the plurality of coupling means is coupled with the fastening members, respectively.

3. The display device of claim 2, wherein the plurality of coupling means comprise coupling projections and coupling ribs that extend in different directions.

4. The display device of claim 2, wherein each coupling means and the respective fastening members are coupled with each other in two or more different directions.

5. The display device of claim 1, wherein the plurality of coupling means are covered by the decorative part.

6. The display device of claim 1, wherein the guide frame has a cutaway area defined by the first and second ends of the outer periphery board of the guide frame, and the plurality of coupling means are provided at the cutaway area.

7. The display device of claim 1, wherein a lower cover is disposed under the display unit and is coupled with the guide frame such that the lower cover fits around an outer periphery of the guide frame.

8. The display device of claim 7, wherein the lower cover comprises a plurality of panel fixing grooves that receive the periphery of the guide frame.

9. The display device of claim 7, wherein the lower cover comprises an auxiliary coupling member that is received in an auxiliary fastening groove formed in the decorative part.

10. A display device comprising:
    a display unit;
    a guide frame contacting and supporting the display unit, wherein the guide frame includes an outer periphery board and side coupling members on a periphery side thereof;
    a decorative part covering only a lower edge of the display unit and comprising fastening members; and
    a rear cover provided behind the guide frame and having a coupling unit,
    wherein the coupling members of the guide frame are provided at the lower edge of the display unit to couple the decorative part to the guide frame,
    wherein the outer periphery board of the guide frame surrounds a top edge and side edges of the display unit and surrounds only a portion of the lower edge of the display unit at first and second ends thereof, the second end being spaced apart from the first end along the lower edge of the display unit, wherein both the guide frame and the decorative part are fixed to the rear cover by the coupling unit, and wherein the coupling unit includes first rear coupling members and second rear coupling members, the decorative part is fixed directly to the rear cover by the first rear coupling members and the guide frame is fixed directly to the rear cover by the second rear coupling members.

11. The display device of claim 10, wherein an outer periphery of the rear cover is exposed.

12. The display device of claim 10, wherein the first rear coupling members are provided on a side of a periphery of the rear cover to be coupled with the fastening members, respectively, and the second rear coupling members are provided along the periphery of the rear cover to be coupled with the side coupling members provided along a periphery of the guide frame, respectively.

13. An apparatus comprising:
a support member configured as a rectangular frame that accommodates an entire periphery of a display panel, the support member having coupling elements and an outer periphery board; and
a front member, configured as an elongated strip that only covers a front-facing lower edge of the display panel provided along a length direction thereof, the front member including fastening elements that engage with the coupling elements,
wherein the outer periphery board of the support member surrounds a top edge and side edges of the display panel and surrounds only a portion of the front-facing lower edge of the display panel at first and second ends thereof, the second end being spaced apart from the first end along the front-facing lower edge of the display panel,
wherein the front member is directly coupled with and fixed to the support member, and
wherein the apparatus having the support member and the front member foregoes the need of a conventional middle frame, resulting in a thinner profile compared to an apparatus that includes the conventional middle frame.

14. The apparatus of claim 13, wherein the coupling elements include coupling projections and coupling ribs.

15. The apparatus of claim 14, wherein the fastening elements include fastening holes and fastening projections that engage with the coupling projections and coupling ribs, respectively.

16. The apparatus of claim 15, wherein a direction of engagement between the coupling projections and the fastening holes is different from a direction of engagement between the coupling ribs and the fastening projections.

17. The apparatus of claim 16, wherein the coupling projections and the fastening holes extend in a height direction of the display panel.

18. The apparatus of claim 17, wherein the coupling ribs and the fastening projections extend in a thickness direction of the display panel.

19. The apparatus of claim 18, further comprising a rear cover located behind the support member,
wherein the support member is a guide frame, and
wherein the guide frame is attached to the rear cover.

* * * * *